United States Patent
Hwang et al.

(10) Patent No.: US 7,558,279 B2
(45) Date of Patent: Jul. 7, 2009

(54) APPARATUS AND METHOD FOR MINIMIZING TRANSMISSION DELAY IN A DATA COMMUNICATION SYSTEM

(75) Inventors: Hyo-Sun Hwang, Suwon-shi (KR); Sung-Hyun Choi, Seoul (KR); Kyung-Hun Jang, Suwon-shi (KR); Young-Soo Kim, Seoul (KR)

(73) Assignees: Samsung Electronics Co., Ltd. (KR); Seoul National University Industry Foundation (KR)

( * ) Notice: Subject to any disclaimer, the term of this patent is extended or adjusted under 35 U.S.C. 154(b) by 523 days.

(21) Appl. No.: 10/851,625

(22) Filed: May 21, 2004

(65) Prior Publication Data

US 2004/0240460 A1 Dec. 2, 2004

(30) Foreign Application Priority Data

May 26, 2003 (KR) ............... 10-2003-0033460

(51) Int. Cl.
*H04L 12/28* (2006.01)
*H04L 12/54* (2006.01)
*H04J 3/24* (2006.01)

(52) U.S. Cl. ............... 370/413; 370/428; 370/473

(58) Field of Classification Search ............... 370/229, 370/230, 235, 236.2, 238, 381, 383, 395.7, 370/395.71, 395.72, 412, 413, 414, 415, 370/416, 417, 418, 428, 429, 465, 468, 470, 370/471, 473, 477
See application file for complete search history.

(56) References Cited

U.S. PATENT DOCUMENTS 4,998,247 A * 3/1991 Irvine-Halliday et al. ... 370/407

| | | | |
|---|---|---|---|
| 6,721,334 B1 * | 4/2004 | Ketcham | 370/473 |
| 6,731,647 B2 * | 5/2004 | Yao | 370/429 |
| 6,741,554 B2 * | 5/2004 | D'Amico et al. | 370/225 |
| 7,185,338 B2 * | 2/2007 | Chamdani et al. | 718/102 |
| 2004/0223507 A1 * | 11/2004 | Kuchibhotla et al. | 370/428 |

FOREIGN PATENT DOCUMENTS

EP 1 189 397 9/2001

OTHER PUBLICATIONS

Calvert et al., "Building a Programmable Multiplexing Service Using Concast", 2000.

* cited by examiner

*Primary Examiner*—Seema S Rao
*Assistant Examiner*—Christine Duong
(74) *Attorney, Agent, or Firm*—McNeely Bodendorf LLP

(57) ABSTRACT

Disclosed is a method for preventing transmission delay occurring when transmitting packet data to a destination in a transmission module including a first memory having a first memory area for storing packet data to be transmitted and a second memory area for backing up the first memory area, a second memory connected to a transmission link, and a frame processor. The method comprises storing a copy of the packet data stored in the second memory area according to a state of the second memory; deleting the packet data stored in the second memory area if copy of the packet data stored in the second memory is transmitted; determining whether packet data combining is possible according to a state of the second memory area; and if the packet data combining is possible, combining the packet data stored in the first memory area with the packet data stored in the second memory area and storing the combined packet data in the second memory.

8 Claims, 9 Drawing Sheets

APPARATUS AND METHOD FOR MINIMIZING TRANSMISSION DELAY IN A DATA COMMUNICATION SYSTEM

PRIORITY

This application claims priority under 35 U.S.C. § 119 to an application entitled "Apparatus and Method for Minimizing Transmission Delay in a Data Communication System" filed in the Korean Intellectual Property Office on May 26, 2003 and assigned Serial No. 2003-33460, the contents of which are incorporated herein by reference.

BACKGROUND OF THE INVENTION

1. Field of the Invention

The present invention relates generally to an apparatus and method for preventing data transmission delay, and in particular, to an apparatus and method for preventing data transmission delay using a combining technique in a high-speed router and a switch.

2. Description of the Related Art

With the rapid increase in the number of Internet users, extensive research is being conducted to determine new methods of increasing the data rate. As a result of the research, various techniques for saving transmission resources and increasing throughput by reducing the overhead of transmission data are being recently proposed. The typical techniques include an overhead compression technique and a packet data combining technique.

A protocol such as TCP/IP (Transmission Control Protocol/Internet Protocol) is generally used when transmitting packet data. The protocol adds a header of 40 30 bytes or more to transmission data A transmission overhead of a predetermined amount occurs regardless of an amount of the actual transmission data. This process deteriorates system performance.

The overhead compression technique compresses headers by 4 to 6 bytes, and adds the compressed headers to the transmission data. This technique can reduce the total number of transmissions, thereby contributing to an increase in transmission throughput and a decrease in a round trip time.

The packet data combining technique combines two or more data packets and then transmits the combined data in one overhead packet in order to reduce the overall overhead of each layer. This also decreases a time delay occurring due to a protocol characteristic in which a header and a tail are added to each transmission data. Such an overhead is larger in size in a wireless environment than in a wired environment. The combining technique performs better in a medium access control (MAC) protocol, and is generally used when transmitting data in a high-speed router or a switch.

FIG. 1 is a block diagram illustrating a structure of a conventional transmission module for preventing transmission delay of packet data. Referring to FIG. 1, the data transmission module is comprised of a transmission manager 10 for controlling management of transmission data and preprocessing for the protocol header, and a transmission protocol engine 20 for transmitting actual packet data according to a transmission protocol.

The transmission manager 10 includes a transmission queue 11 for storing data and a frame processor 12 for combining data packets stored in the transmission queue 11, for data management. Further, the transmission manager 10 includes a transmission wait timer (Tx_Wait_Timer) for delaying packet data stored in the transmission queue 11 in order to combine the packet data with subsequent packet data received.

The transmission protocol engine 20 includes a transmission buffer 21 for storing packet data received from the transmission queue 11 to transmit the stored packet data at a transmission time, and a transmission controller 22 for controlling transmission of the packet data. The operation of combining transmission packet data in the transmission module stated above will now be described with reference to FIGS. 2A and 2B.

As illustrated in FIG. 2A, if new packet data is received in an idle state, the frame processor 12 delays the received packet data by driving the transmission wait timer. As illustrated in FIG. 2B, if previous packet data is stored in the transmission queue 11 in a busy state of a channel, the frame processor 12 combines the currently received packet data with the previous packet data, and transmits the combined packet data to the transmission buffer 21. The transmission buffer 21 then stores the combined packet data and transmits the stored combined packet data to a corresponding destination at a transmission time.

When a data reception rate is low, there is low probability that two or more data packets will accumulate in the transmission queue 11. In this case, data received at the transmission queue 11 is not immediately sent to the transmission buffer 21, but is delayed using the transmission wait timer, which in turn increases the probability that data will accumulate in the transmission queue 11. In the combining technique, even though data can be rapidly transmitted without transmission delay in view of a good channel condition, transmission data is delayed due to the transmission wait timer.

In addition, although data combined by the transmission buffer 21 is stored, if the stored combined data cannot be transmitted because of a busy state of a channel, data will accumulate in the transmission queue 11. In order to increase transmission throughput, it is effective to combine data in the transmission buffer 21 with data in the transmission queue 11. However, the conventional combining technique can combine only the data in the transmission queue 11, since the transmission manager 10 cannot consider a situation of the transmission buffer 21.

SUMMARY OF THE INVENTION

It is, therefore, an object of the present invention to provide an apparatus and method for preventing transmission delay using a descriptor combining technique capable of recombining.

It is another object of the present invention to provide an apparatus and method for preventing transmission delay by adding a backup queue to a transmission module.

To achieve the above and other objects, there is provided an apparatus for reducing transmission delay of packet data. The apparatus comprises a first memory having a first memory area for storing packet data to be transmitted and a second memory area for temporarily storing the packet data and for combining the packet data with subsequent packet data; a second memory for receiving and storing a copy of the packet data temporarily stored in the second memory area, and transmitting the packet data to a destination according to a link state; and a frame processor for storing a copy of the packet data stored in the second memory area in the second memory according to a state of the second memory, deleting packet data stored in the second memory area when the copy of the packet data stored in the second memory is transmitted, determining whether packet data combining is possible according to a state of the second memory area, and, if the packet data combining is possible, combining packet data stored in the first memory area with the packet data stored in the second memory area, and storing the combined packet data in the second memory.

To achieve the above and other objects, there is provided a method for reducing transmission delay occurring when transmitting packet data to a destination in a transmission module including a first memory having a first memory area for storing the packet data to be transmitted and a second memory area for backing up the first memory area, a second memory connected to a transmission link, and a frame processor. The method comprises the steps of: storing a copy of the packet data stored in the second memory area according to a state of the second memory; deleting the packet data stored in the second memory area if the copy of the packet data stored in the second memory is transmitted; determining whether packet data combining is possible according to a state of the second memory area; and if the packet data combining is possible, combining the packet data stored in the first memory area with the packet data stored in the second memory area and storing the combined packet data in the second memory.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
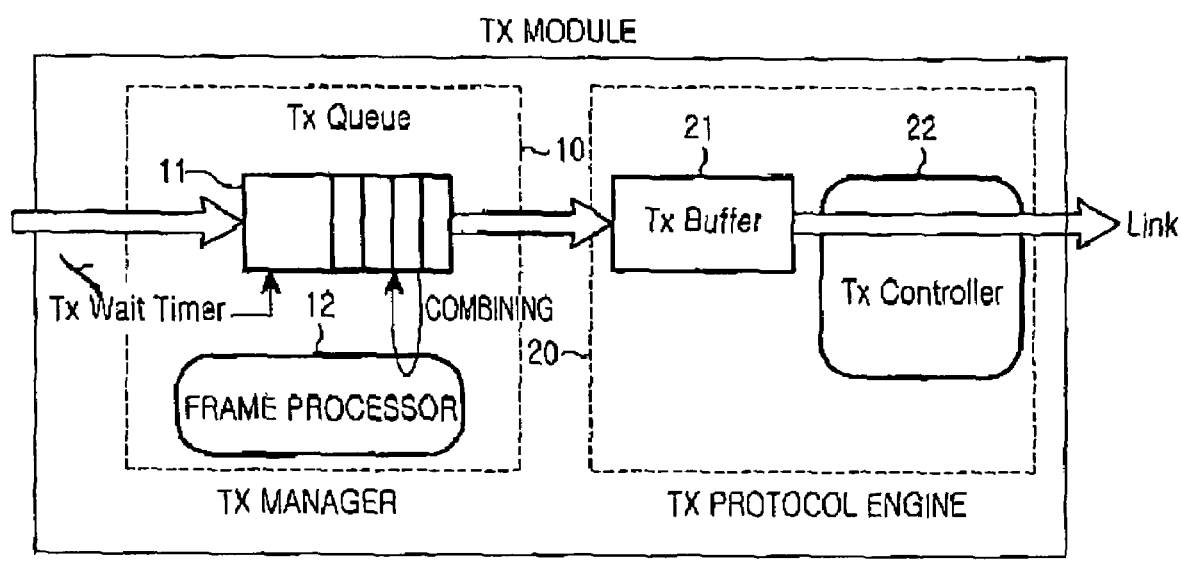
FIG. 1 is a block diagram illustrating a structure of a conventional transmission module for preventing transmission delay of packet data.
Figure 2A:
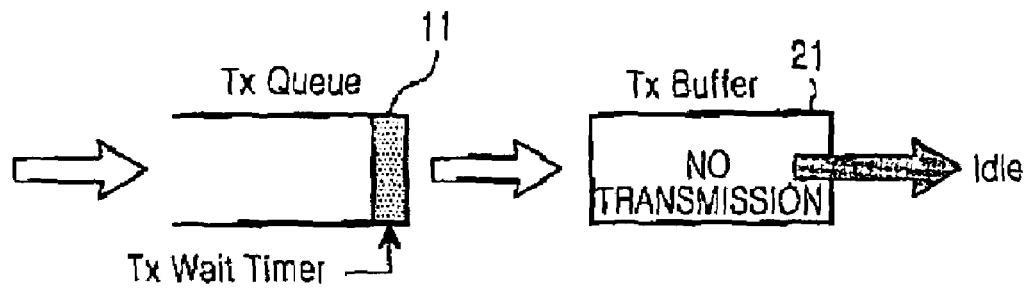
FIGS. 2A and 2B are block diagrams illustrating an operation of combining transmission packet data in the conventional transmission module.
Figure 2B:
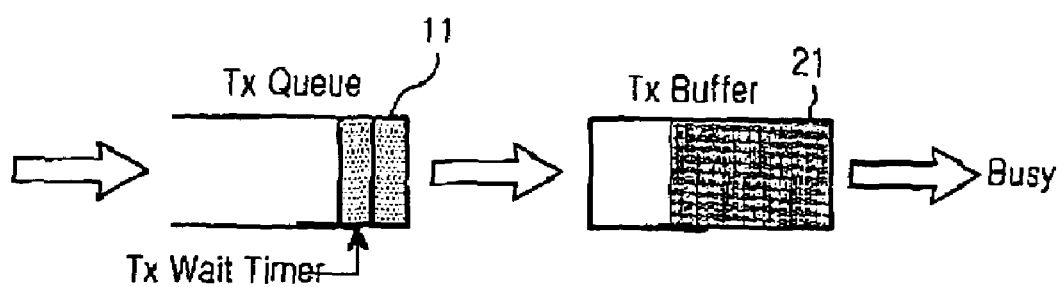

Several preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for clarity.

In a transmission module to which a descriptor combining technique is to be applied according to the prevention invention, a backup queue for temporarily storing packet data transmitted to a transmission buffer without being combined in a transmission queue is added to a transmission manager. The backup queue is used for recombining. Therefore, a transmission wait timer is not required. A structure of the transmission module supporting the descriptor combining technique will now be described in detail with reference to the accompanying drawings.

Figure 3:
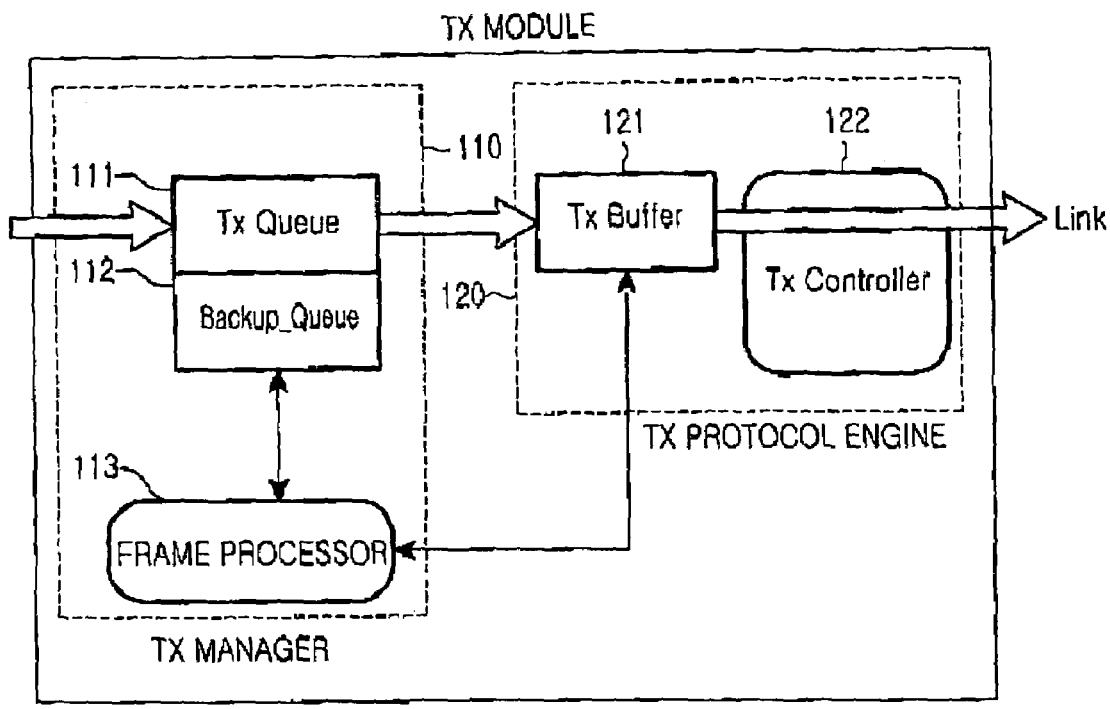
FIG. 3 is a block diagram illustrating a structure of a transmission module for data combining according to an embodiment of the present invention.

FIG. 3 is a block diagram illustrating a structure of a transmission module for data combining according to an embodiment of the present invention. Referring to FIG. 3, the data transmission module is comprised of a transmission manager 110 for controlling management of transmission data and preprocessing a protocol header, and a transmission protocol engine 120 for transmitting actual packet data according to a transmission protocol.

The transmission manager 110 includes a transmission queue 111 for storing data and a frame processor 113 for combining data packets stored in the transmission queue 111, for data management. In addition, the transmission manager 110 includes a backup queue 112 for temporarily storing packet data to be transmitted to the transmission protocol engine 120. The backup queue 112 is realized using a separate list linked to the transmission queue 111 rather than a separate new memory. That is, the backup queue 112 manages data using only a memory link without movement of a separate memory between the backup queue 112 and the transmission queue 111.

The transmission protocol engine 120 includes a transmission buffer 121 for storing packet data received from the transmission queue 111 to transmit the stored packet data at a transmission time, and a transmission controller 122 for controlling transmission of the packet data. An operation of combining packet data in the stated-above transmission module according to an embodiment of the invention will now be described.

Figure 4A:
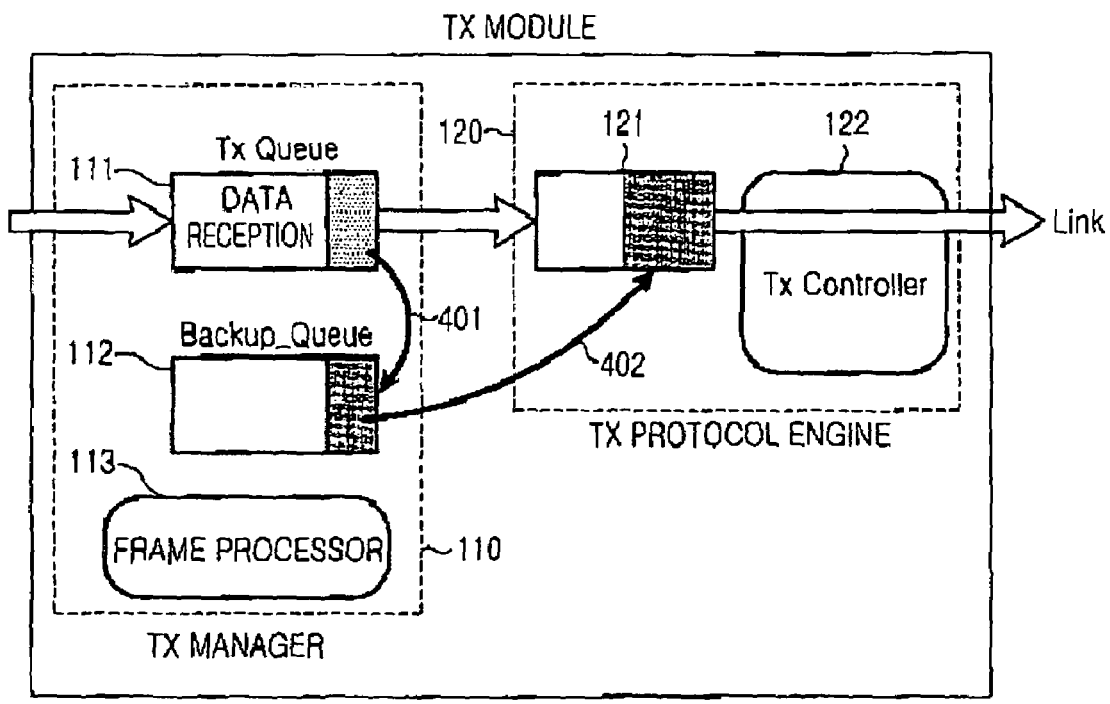
FIG. 4A is a block diagram illustrating an operation of linking transmission data to a backup queue and then delivering the transmission data to a transmission buffer in an idle state according to an embodiment of the present invention.

FIG. 4A is a block diagram illustrating an operation of linking transmission data to a backup queue and then delivering the transmission data to a transmission buffer in an idle state according to an embodiment of the present invention. Referring to FIG. 4A, if new data is received at the transmission queue 111 of the transmission manager 110, the frame processor 113 compares data stored in the transmission queue 111 with data stored in the transmission buffer 121 to determine whether they can be combined. At this moment, if there is no data previously stored in the transmission queue 111, i.e., if the transmission queue 111 is null (or empty), the frame processor 113 temporarily stores the received packet data in the backup queue 112 in step 401 since there is no data to be combined, and immediately transmits the same packet data to the transmission buffer 121 in step 402.

Then, the transmission controller 122 of the transmission protocol engine 120 determines whether a link connected to the transmission buffer 121 is busy. At this moment, if the link is in an idle state, the transmission controller 122 immediately transmits the packet data stored in the transmission buffer 121 to a destination. Accordingly, the frame processor 113, which was monitoring the transmission buffer 121, deletes the packet data stored in the backup queue 112.

Figure 4B:
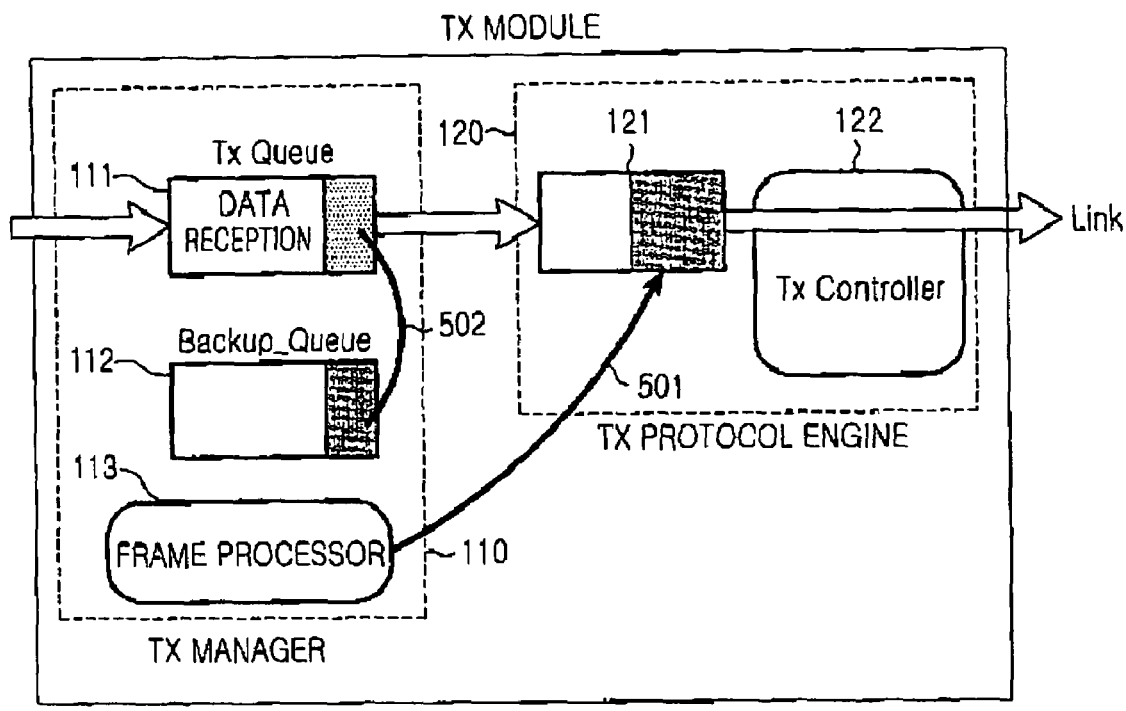
FIG. 4B is a block diagram illustrating an operation of combining packet data upon receiving new packet data in a busy state according to an embodiment of the present invention.

With reference to FIG. 4B, a description will now be made of the case where new data is received at the transmission queue 111 in a busy state due to a poor link state while packet data received in an idle state is being transmitted to a corresponding destination.

The transmission module, as illustrated in FIG. 4B, is in a busy state of a transmission link, that is, data stored in the transmission buffer 121 is awaiting transmission to a corresponding destination. Accordingly, if new packet data arrives at the transmission queue 111 while previously arrived packet data is stored in the backup queue 112 and the transmission buffer 121, the frame processor 113 determines whether packet data stored in the transmission queue 111 can be combined with packet data stored in the backup queue 112. That is, the frame processor 113 determines whether there is packet data in the backup queue 112.

As a result of the determination, if the combining is possible, it means that the same packet data as the packet data temporarily stored in the backup queue 112 is currently stored in the transmission buffer 121 and has not yet been transmitted. The frame processor 113 deletes the packet data in the transmission buffer 121 on a flush basis in step 501. Thereafter, in step 502, the frame processor 113 combines the currently received packet data in the transmission queue 111 with the previous packet data temporarily stored in the backup queue 112, and stores the combined packet data back in the backup queue 112.

An operation of transmitting packet data temporarily stored in the backup queue 112 to the transmission buffer 121 will now be described with reference to FIG. 4C.

Figure 4C:
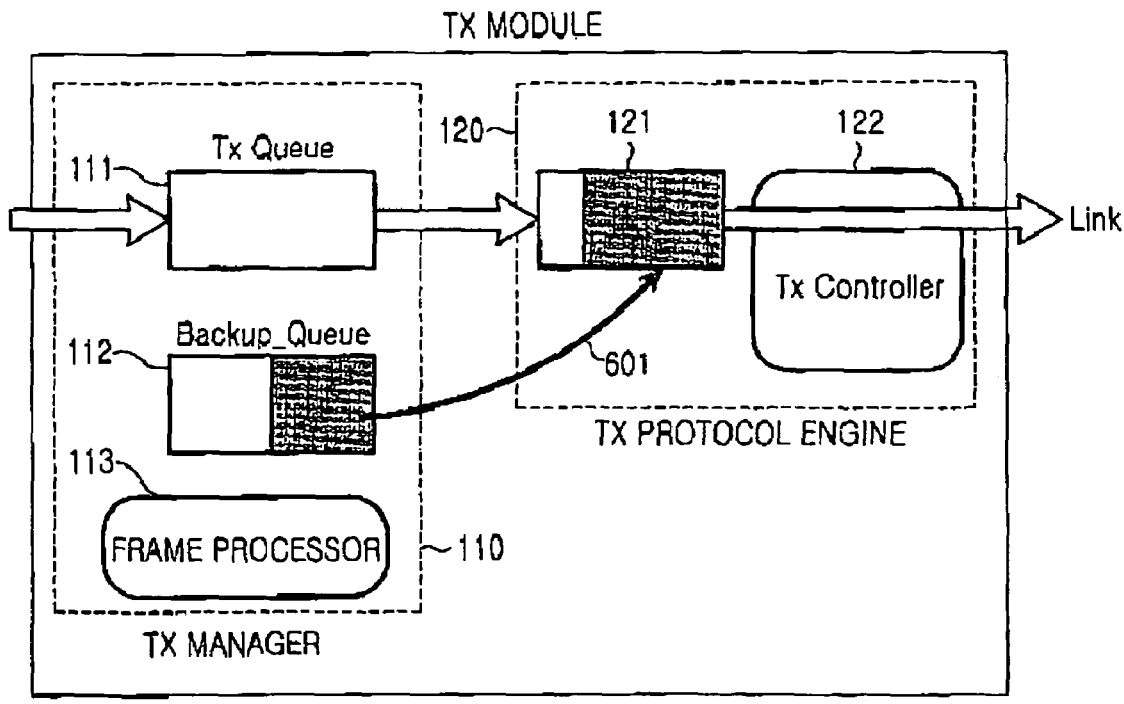
FIG. 4C is a block diagram illustrating an operation of transmitting combined packet data to a transmission buffer according to an embodiment of the present invention.

Referring to FIG. 4C, in step 601, the frame processor 113 transmits the combined packet data to the transmission buffer 121. The transmission buffer 121 then stores the combined packet data, and transmits the combined packet data to a destination if a connected link has a good condition at a transmission time. However, when the link is continuously in a busy state, it means that the combined packet data stored in the transmission buffer 121 is continuously awaiting transmission at the transmission time. In this case, if new packet data is received at the transmission queue 111, the frame processor 113 recombines the newly received packet data with the combined packet data. The recombining operation will be described in detail with reference to the accompanying drawings.

Figure 4D:
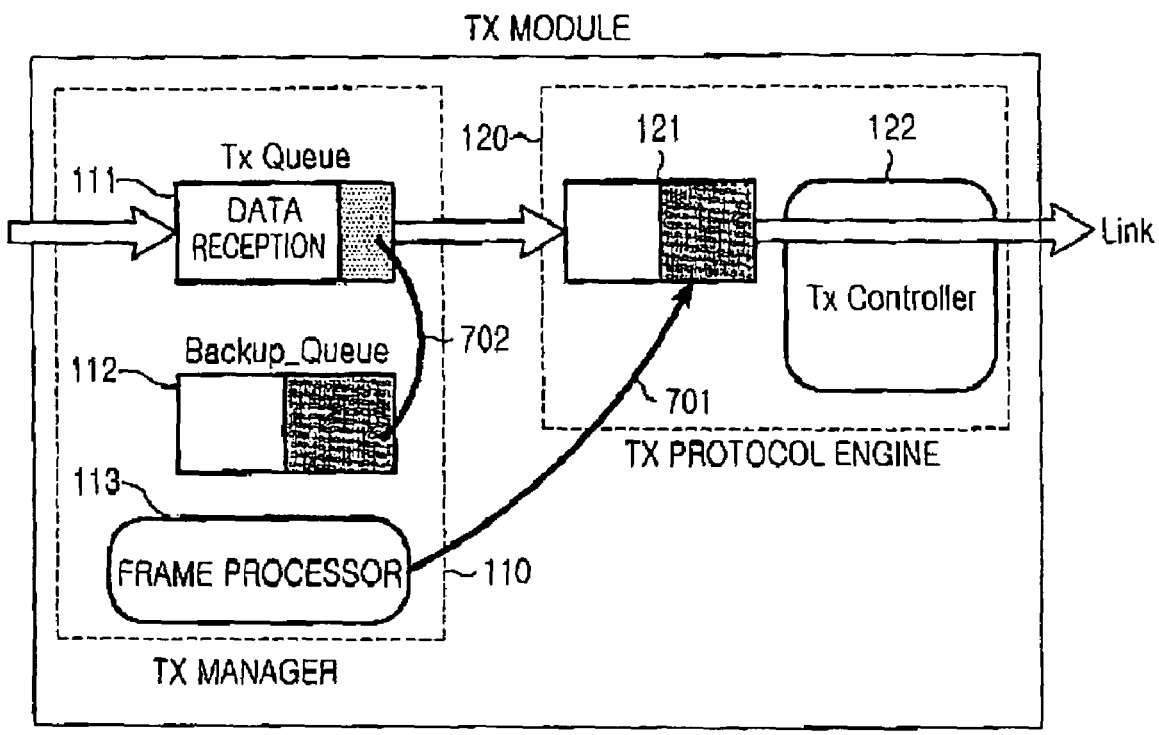
FIG. 4D is a block diagram illustrating an operation of recombining combined packet data with new packet data according to an embodiment of the present invention.

FIG. 4D is a block diagram illustrating an operation of recombining combined packet data with new packet data according to an embodiment of the present invention. Referring to FIG. 4D, when new packet data is received at the transmission queue 111, the frame processor 113 deletes packet data stored in the transmission buffer 121 on a flush basis in step 701 in order to recombine the received packet data in the transmission queue 111 with packet data stored in the backup queue 112. Thereafter, in step 702, the frame processor 113 recombines the received packet data in the transmission queue 111 with the combined packet data in the backup queue 112, and transmits the recombined packet data to the transmission buffer 121. The transmission controller 122 then continuously monitors a link condition and transmits the packet data stored in the transmission buffer 121 to a destination.

A description will now be made of states of the backup queue 112 and the transmission buffer 121 by using a descriptor when, for example, a MAC protocol is applied in the transmission module's operation in the busy state of the link.

Figure 5A:
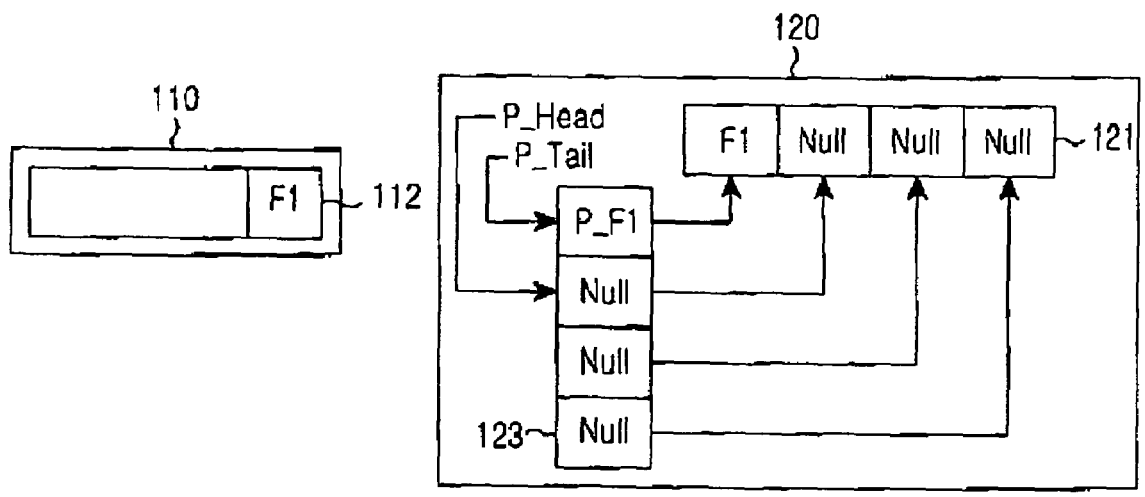
FIG. 5A is a block diagram illustrating states of a transmission buffer and a backup queue in a transmission module when a MAC protocol is applied in an idle state according to an embodiment of the present invention.

FIG. 5A is a block diagram illustrating states of a transmission buffer and a backup queue in a transmission module when a MAC protocol is applied in an idle state according to an embodiment of the present invention. Referring to FIGS. 3 and 5A, when packet data arrives at the transmission queue 111, the frame processor 113 determines whether combining is possible. That is, the frame processor 113 determines whether there is any packet data in the backup queue 112. As a result of the determination, if the combining is not possible, the frame processor 113 transmits packet data F1 in the transmission queue 111 to the transmission buffer 121. Further, the frame processor 113 temporarily stores the packet data F1 in the backup queue 112. A first area of the transmission buffer 121 is represented by "F1" since the received packet data is stored therein, while the other areas are shown by "Null" since there is no packet data stored therein. In addition, a first area of a descriptor 123 having information on the packet data in the transmission buffer 121 is represented by "P_F1" as it is a first area of the transmission buffer 121, while the other areas are represented by "Null."

FIGS. 5B to 5F are block diagrams illustrating states of the transmission buffer and the backup queue of the transmission module when a MAC protocol is applied in a busy state according to an embodiment of the present invention.

Figure 5B:
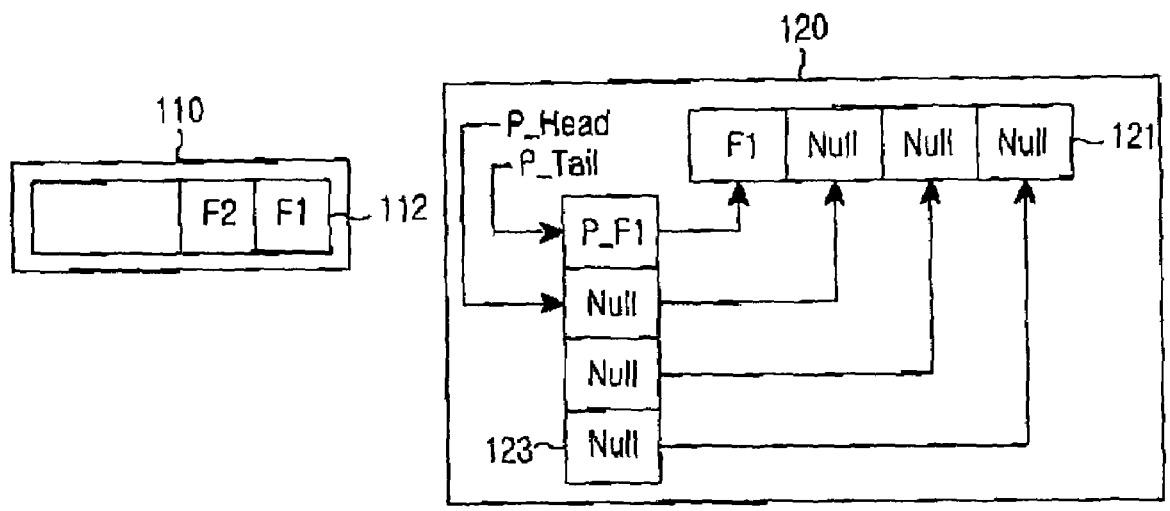
FIGS. 5B to 5F are block diagrams illustrating states of a transmission buffer and a backup queue of a transmission module when a MAC protocol is applied in a busy state according to an embodiment of the present invention.
Figure 5C:
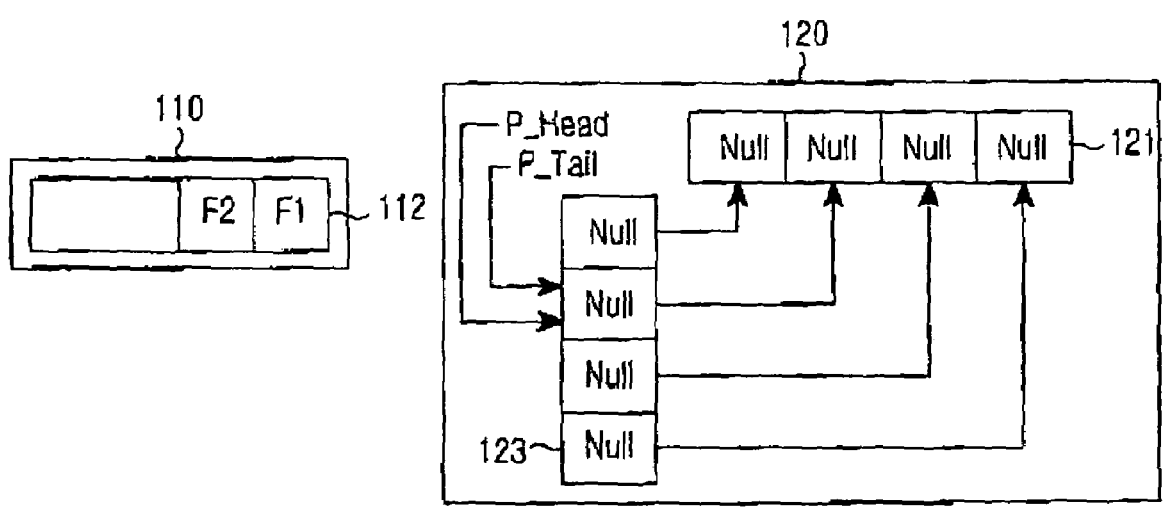

Referring to FIG. 5B, if new packet data F2 is received at the transmission queue 111, the backup queue 112 stores a copy of the received packet data F2. At this moment, previous packet data F1 has been stored in the transmission buffer 121 and has not yet been transmitted to a corresponding destination. In this state, the frame processor 113 can combine the packet data F1 with the packet data F2. In this case, the transmission buffer 121 and the descriptor 123 are identical in states to the transmission buffer 121 and the descriptor 123 of FIG. 5A, and, in this state, the packet data F1 has not been transmitted yet. In this state, the frame processor 113, as illustrated in FIG. 5C, deletes the packet data F1 stored in the transmission buffer 121, so all areas are null. Thus, all areas of the descriptor 123 are represented by "Null."

Figure 5D:
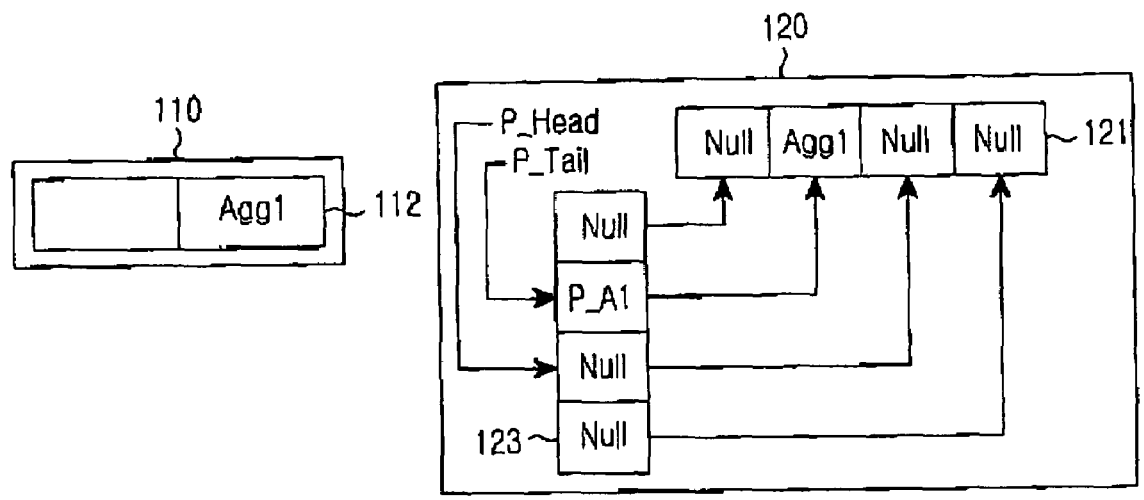

Referring to FIG. 5D, if currently received packet data F2 is combined with previously received packet data F1, the backup queue 112 stores a copy of the combined (or aggregated) packet data Agg1, and the transmission buffer 121 stores the combined packet data Agg1 in its second area. At this moment, the other areas of the transmission buffer 121 are all null. In addition, a second area of the descriptor 123 is represented by "P_A1," while the other areas are shown by "Null."

Figure 5E:
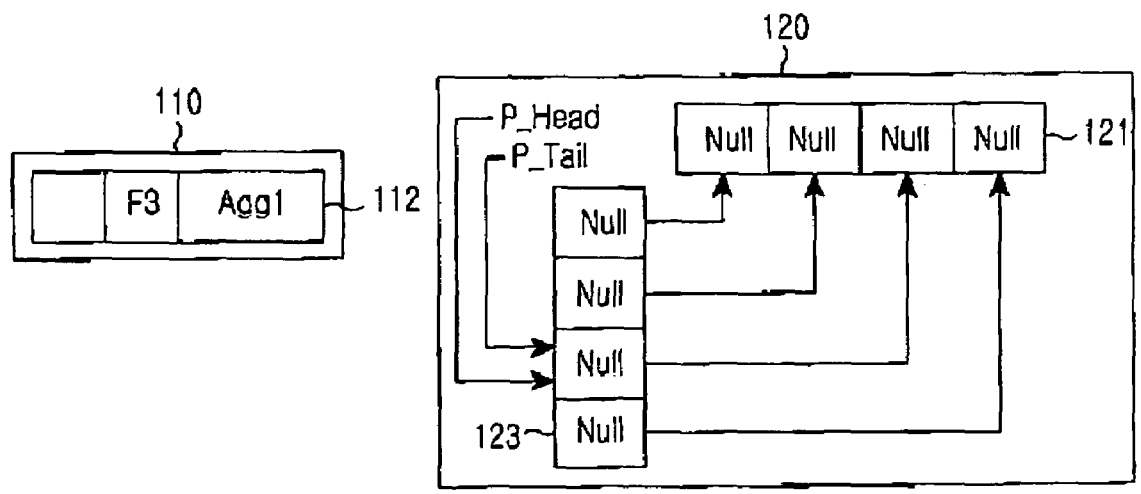

Referring to FIG. 5E, if new packet data F3 is received at the backup queue 112, and data Agg1 has not yet been transmitted, the frame processor 113 deletes packet data Agg1 stored in the transmission buffer 121, so all areas of the transmission buffer 121 are null. In addition, all areas of the descriptor 123 are represented by "Null."

Figure 5F:
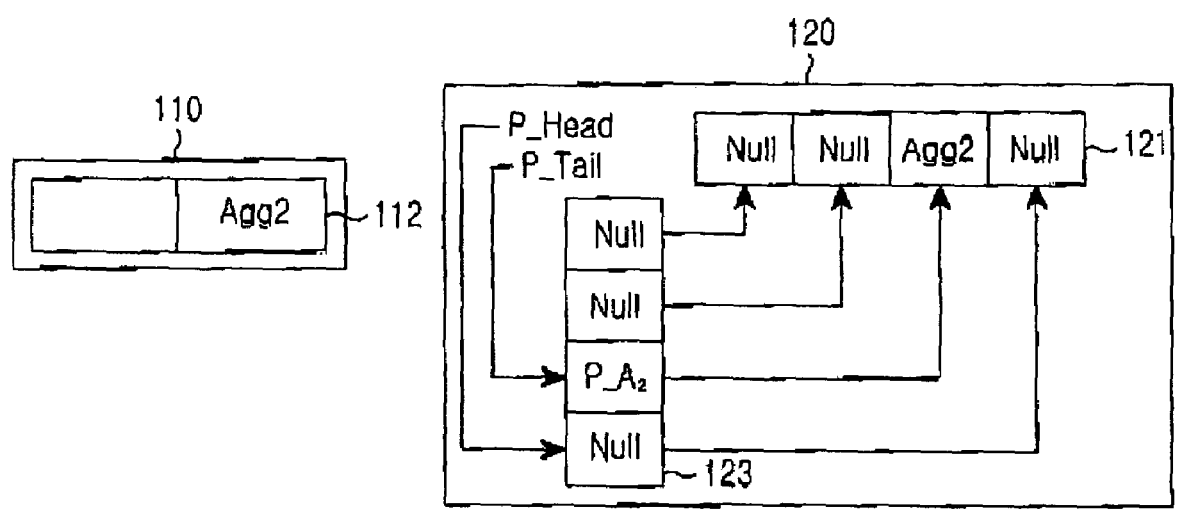

Referring to FIG. 5F, if the fame processor 113 combines the new packet data F3 with the previously combined packet data Agg1, the backup queue 112 stores a copy of recombined packet data Agg2, and the transmission buffer 121 stores the recombined packet data Agg2 in its third area. In this case, a third area of the descriptor 123 is represented by "P_A2," while the other areas are represented by "Null."

Figure 6:
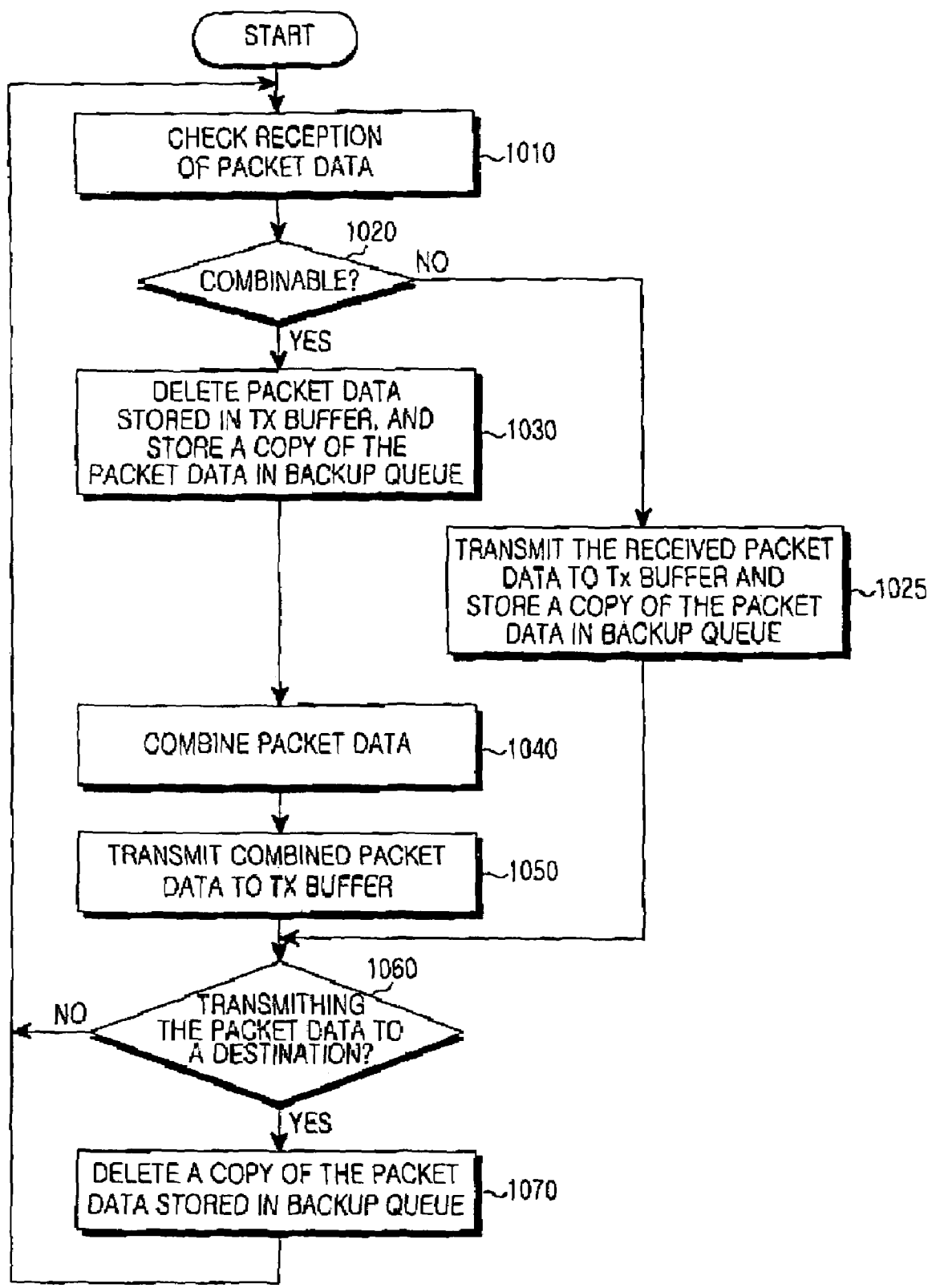
FIG. 6 is a flowchart illustrating an operation of combining packet data in a transmission module according to an embodiment of the present invention.

FIG. 6 is a flowchart illustrating an operation of combining packet data in a transmission module according to an embodiment of the present invention. Referring to FIG. 6, in step 1010, the frame processor 113 determines whether data is received at the transmission queue 111. As a result of the determination, if data is received at the transmission queue 111, the frame processor 113 determines in step 1020 whether the received packet data can be combined, i.e., whether a copy of the packet data is stored in the backup queue 112. If the combining is not possible, i.e., there is not stored a copy of the packet data, the frame processor 113 transmits the received packet data intact to the transmission buffer 121 in step 1025 and stores temporarily the packet data in the backup queue 112, and then proceeds to step 1060. Otherwise, if the combining is possible, the frame processor 113 copies packet data stored in the transmission buffer 121 in step 1030, transmits a copy of the packet data to the backup queue 112 and deletes the packet data stored in the transmission buffer. Thereafter, in step 1040, the frame processor 113 combines previous packet data stored in the backup queue 112 with the received packet data and at the same time, stores the combined packet data in the backup queue 112. Thereafter, in step 1050, the frame processor 113 transmits the combined packet data to the transmission buffer 121. Then, the transmission controller 122 of the transmission protocol engine 120 determines whether a link connected to the transmission buffer 121 is busy. At this time, if the link is in an idle state, the transmission controller 122 immediately transmits the packet data stored in the transmission buffer 121 to a destination. Accordingly, the frame processor 113, which monitors the transmission buffer 121, determines whether the packet data arrives at the destination in step 1060. If the packet data arrives at the destination, the frame processor 113 returns to step 1010 where it determines whether new packet data is received at the transmission queue 111. However, if the packet data is not transmitted to the destination, the frame processor 113, which was monitoring the transmission buffer 121 in step 1070, deletes the packet data stored in the backup queue 112 and then returns to step 1010.

While the invention has been described in detail with reference to a packet data combining technique, the packet data combining technique according to the present invention can also be applied together with a technique for compressing a header of packet data when combining the packet data stored in the transmission queue.

As described above, the invention temporarily stores packet data to be transmitted to a transmission buffer, determines a state of the transmission buffer, and immediately transmits the packet data when the transmission buffer is in an idle state, and combines the newly received packet data with previously received packet data before transmission when the transmission buffer is in a busy state, thereby preventing transmission delay of packet data and increasing transmission throughput. In addition, when even the combined packet data cannot be transmitted in the busy state, the invention recombines the combined packet data, thereby more effectively preventing transmission delay and increasing transmission throughput. Moreover, since a backup queue can utilize an existing transmission queue by adding an independent link, additional memory capacity is not required and movement of memory data is minimized, thereby contributing to minimization of performance degradation.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An apparatus for reducing transmission delay of packet data, the apparatus comprising:
a first memory having a first memory area for storing first packet data to be transmitted, and a second memory area for temporarily storing the first packet data and for combining the first packet data with subsequent second packet data;
a second memory for receiving and storing a copy of the first packet data temporarily stored in the second memory area, and transmitting the first packet data to a destination according to a link state; and
a frame processor for copying the first packet data from the first memory area to the second memory area, storing a copy of the first packet data stored in the second memory area according to a state of the second memory, deleting the first packet data stored in the second memory area when the copy of the first packet data stored in the second memory is transmitted, determining whether packet data combining is possible according to a state of the second memory area, and combining packet data stored in the first memory area with packet data stored in the second memory area and storing the combined packet data in the second memory if packet data combining is possible.

2. The apparatus of claim 1, further comprising a descriptor indicating an address and a packet data storage state of the second memory.

3. The apparatus of claim 1, wherein the frame processor flushes packet data stored in the second memory before storing the combined packet data in the second memory, if packet data combining is possible.

4. A method for reducing transmission delay occurring when transmitting packet data to a destination in a transmission module including a first memory having a first memory area for storing packet data to be transmitted and a second memory area for backing up the first memory area by storing a copy of the packet data, a second memory connected to a transmission link, and a frame processor, the method comprising the steps of:
storing a copy of the packet data stored in the second memory area according to a state of the second memory;
deleting the packet data stored in the second memory area when the copy of the packet data stored in the second memory is transmitted;
determining whether packet data combining is possible according to a state of the second memory area; and
combining packet data stored in the first memory area with the packet data stored in the second memory area and storing the combined packet data in the second memory if packet data combining is possible.

5. The method of claim 4, wherein the packet data temporarily stored in the second memory area is deleted if packet data in the second memory is transmitted to a destination.

6. The method of claim 4, wherein if packet data combining is possible, the packet data stored in the second memory is flushed before the combined packet data is stored in the second memory.

7. The apparatus of claim 1, wherein the frame processor determines whether the packet data has been transmitted prior to deleting the first packet data stored in the second memory area.

8. The method of claim 4, wherein deleting the packet data stored in the second memory area comprises if the copy of the packet data stored in the second memory is transmitted the frame processor determines whether the packet data has been transmitted prior to deleting the first packet data stored in the second memory area.

* * * * *